United States Patent [19]

Milo

[11] 3,740,740

[45] June 19, 1973

[54] LIQUID CRYOGEN DETECTOR

[75] Inventor: William C. Milo, Anaheim, Calif.

[73] Assignee: The United States of America as represented by the Secretary of the Army, Washington, D.C.

[22] Filed: Jan. 12, 1972

[21] Appl. No.: 217,179

[52] U.S. Cl. .............................. 340/244 R, 73/295
[51] Int. Cl. .......................................... G08b 21/00
[58] Field of Search .................. 340/244 R, 244 C; 73/295

[56] References Cited
UNITED STATES PATENTS
3,267,730  8/1966  Satterthwaite et al. ...... 340/244 R X
FOREIGN PATENTS OR APPLICATIONS
1,391,944  2/1965  France .................................. 73/295

Primary Examiner—John W. Caldwell
Assistant Examiner—Daniel Myer
Attorney—Charles K. Wright, William G. Gapcynski, Lawrence A. Neureither et al.

[57] ABSTRACT

A carbon composition resistor sensor is lowered to a cryogen material which is in its cryogenic state. The current through the sensor is maintained constant by a regulator, and when a sustantial change in the resistance of the carbon sensor occurs, an amplifier having its input connected across the regulator senses the change in the resistance of the regulator and causes a light to go on or off so as to indicate the top level of the cryogenic material.

1 Claim, 1 Drawing Figure

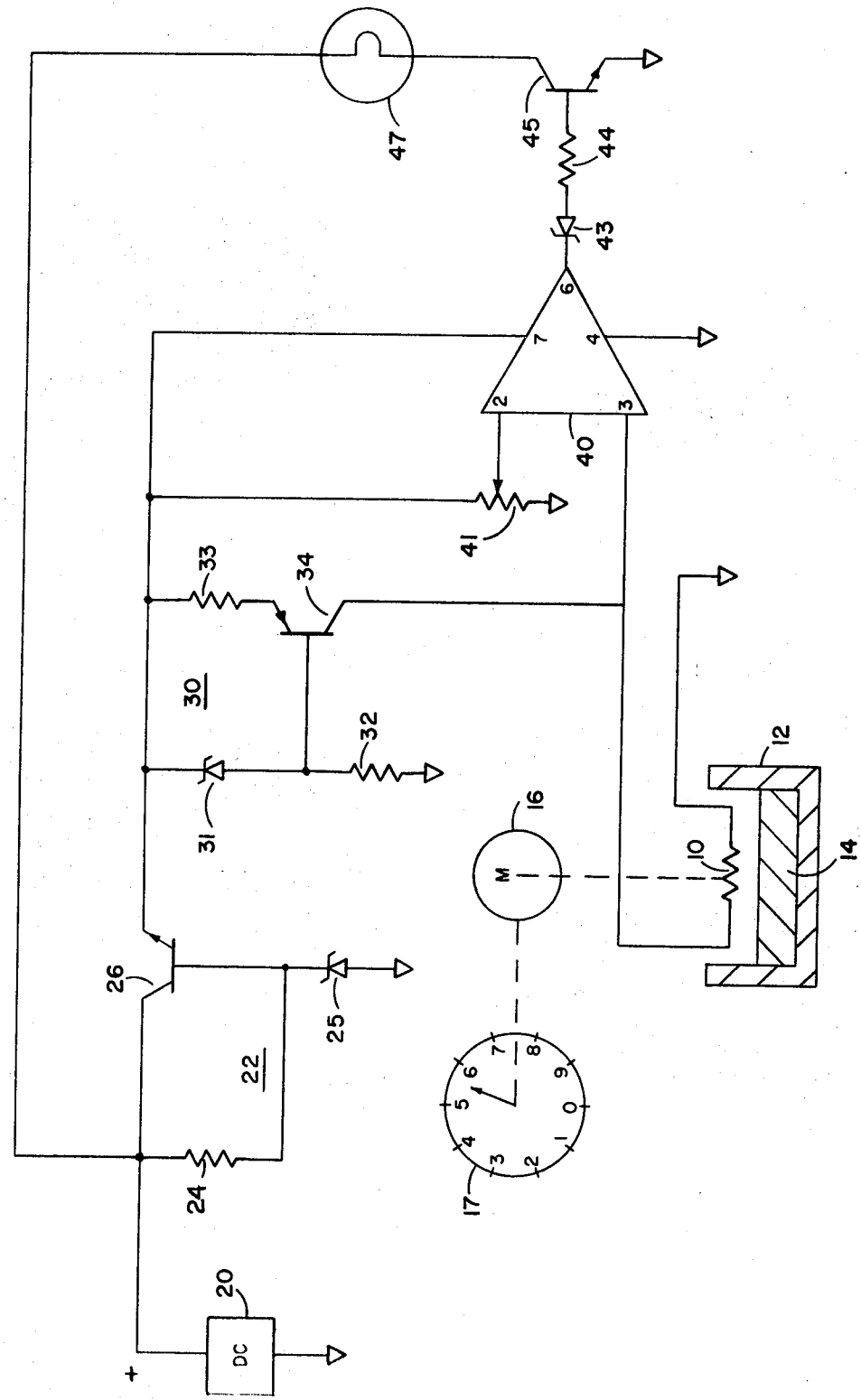

LIQUID CRYOGEN DETECTOR

SUMMARY OF THE INVENTION

A carbon composition resistor whose resistance will change radically upon being subjected to cryogenic temperatures is inserted by a moveable device into the cryogen material clear to the bottom of the dewar. The moveable device has a sliding scale which is set at zero when it is at the bottom of the dewar. The resistor is then raised from the dewar until the light of the sensing system just goes out. At this point the depth of the cryogenic material can be read on the sliding scale. The resistor is fed current from a power source through a constant current regulator. An amplifier senses the voltage across the constant current regulator thereby detecting when the resistor changes its resistance. The amplifier feeds a signal light so as to indicate the top level of the cryogenic material where the resistor will suddenly change its resistance.

BRIEF DESCRIPTION OF THE DRAWING

The single FIGURE shows in schematic form a preferred embodiment of the invention.

DESCRIPTION OF THE PREFERRED EMBODIMENT

The single FIGURE shows a ⅛ watt 1 kilo ohm carbon composition resistor 10 which may be inclosed in a water tight container. A dewar 12 containing a cryogen 14 such as helium, nitrogen, neon or the like is shown positioned to receive the resistor 10. A means 16 such as a motor is shown for driving the resistor 10 into and out of the cryogen 14. A scale 17 is provided to show what distance the resistor 10 has travelled. Scale 17 can be set to zero when resistor 10 is at the bottom of the dewar 12. In this way when the resistor 10 is moved up to the top level of cryogen 14 and stopped, then the depth of cryogen 14 can be read on scale 17. A DC power voltage source 20 is connected to a voltage regulator 22 so that a variable amount of voltage at 20 may be connected to the system. Voltage regulator 22 comprises resistor 24, zenor diode 25 and transistor 26. This voltage regulator 22 will regulate the voltage to a constant value at the emitter side of transistor 26 in a manner well known in the art. A constant current regulator 30 is provided to supply resistor 10 with a constant amount of current. Regulator 30 consists of zenor diode 31, resistor 32, resistor 33, and transistor 34. Zenor diode 31 will present a constant voltage to the base of transistor 34, therefore when the current through resistor 33 tends to increase, the voltage across the base will become less, therefore increasing the impedance of transistor 34. When the current through resistor 33 tends to decrease, the voltage between emitter and base circuit of transistor 34 increases, therefore causing transistor 34 to present less impedance to current flow. In this way the circuit 30 will regulate the current flow to resistor 10 to a constant value. An amplifier 40 is provided with inputs 2 and 3 which will sense the voltage of regulator 30 by way of potentiometer 41. Amplifier 40 is provided power through its terminals 4 and 7 and has its output across terminals 4 and 6. The output of amplifier 40 is fed through zenor diode 43 to resistor 44 to transistor 45. When the output of amplifier 40 is sufficient, zenor diode 43 will break down and transistor 45 will become conducting so as to allow light 47 to illuminate.

In operation the resistance across resistor 10 will be high as long as it is located outside of the cryogen 14. When the resistance of the resistor is high the voltage drop across regulator 30 will therefore be low. This will present a low voltage across the input of amplifier 2 and 3, therefore preventing the output of the amplifier from being sufficient to turn on transistor 45. When resistor 10 is lowered into cryogen 14 (or cryogen 14 has its level raised to resistor 10) the temperature of resistor 10 goes down to its cryogenic state thereby lowering its resistance state sharply over about a 10 percent value. This reduction in the resistance of resistor 10 will mean that current regulator 30 will have to increase its resistance in order to maintain a constant current. This increase in resistance of regulator 30 will mean that a larger voltage drop will be present across 30 and therefore a larger voltage will be presented to the input of amplifier 40. Amplifier 40 will now have an output sufficient to turn on transistor 45 and therefore illuminate light 47. It can be seen from this, that light 47 will just go on when resistor 10 first enters into the cryogen 14 (or when cryogen 14 level increases to the height of resistor 10).

There are two basic ways in which this invention may be utilized. One, the resistor 10 can be lowered into the dewar 12 until it reaches bottom at this point scale 17 will be set to zero. Now when a cryogen 14 is present the resistor 10 will be in its cryogenic state and light 47 will be on. In order to read the height of the cryogen 14 all one needs to do is to raise resistor 10 by the motor 16 until light 47 just goes off. At this point the depth of the cryogen may be read on scale 17. Another way the invention may be used is to calibrate the dial 17 as before; however, when the resistor 10 is raised to the level one wants the cryogen 14 to obtain, the resistor is stopped. The cryogen material is then added to the dewar 12 until light 47 just goes on. This will be the desired height. The sensor 10 could also be permanently mounted in the wall of dewar 12 at a preselected height.

I claim:

1. A cryogen level detector comprising a resistor; means for causing said resistor to go into and out of said cryogen material whereby said resistor will correspondly sharply change its resistance from a low state to a high state; sensing means connected to said resistor to sense its state; an indicator connected to the output of the sensing means so as to indicate the state of said resistor; said sensing means comprise a power source; a current regulator; and an amplifier having inputs and outputs; said power source, current regulator and resistor being connected in a series circuit whereby a constant current will flow through this circuit; said amplifier having its input connected across said current regulator so as to sense the voltage thereacross; the output of said amplifier being connected to said indicating means; said low state of said resistor is a cryogenic state and said high state is not a cryogenic state; said indicating means is a light means which will go on when said resistor is in a cryogenic state and will be off when said resistor is not in a cryogenic state; said resistor being moveably mounted with respect to said cryogen; and scale means connected to said moveable means so as to indicate the height of said resistor.

* * * * *